428-908.8 SR

8/4/87 XR 4,684,264

United States Patent [19]

Paperno et al.

[11] Patent Number: 4,684,264

[45] Date of Patent: Aug. 4, 1987

[54] PROTECTIVE OVERLAY FOR WATCH CRYSTAL

[76] Inventors: Steven H. Paperno, 4558 Cherry Valley Cir.; Lisa R. Monica, 4226 Danwood Dr., both of Westlake Village, Calif. 91362

[21] Appl. No.: 811,406

[22] Filed: Dec. 20, 1985

[51] Int. Cl.[4] .......................... G04B 37/00; B32B 3/00

[52] U.S. Cl. .................................... 368/283; 368/285; 368/286; 368/296; 428/908.8

[58] Field of Search ............... 368/285, 286, 223, 228, 368/232, 234, 296; 428/201-203, 908.8

[56] References Cited

U.S. PATENT DOCUMENTS 1,503,097 7/1924 Davingl .............................. 368/285
1,767,315 6/1930 Schreiber ............................ 368/283
3,316,709 5/1967 Edwards ............................ 368/296
4,409,275 10/1983 Samowich ........................ 428/908.8
4,409,280 10/1983 Willy et al. ...................... 428/908.8
4,509,644 4/1985 Kulick ................................ 368/286

*Primary Examiner*—Vit W. Miska
*Attorney, Agent, or Firm*—Kelly, Bauersfeld & Lowry

[57] ABSTRACT

A protective overlay is provided for preventing scratching or chipping of the crystal of a wristwatch, while permitting visual determination of the time of day. The overlay comprises a circular disk of a transparent high static vinyl sheet material adapted for stick-on attachment to a glass or plastic watch crystal without use of an adhesive. The exposed or front side of the disk bears selected decorative ornamentation and is covered by a transparent surface layer which seals the ornamentation against smudging and the like.

16 Claims, 5 Drawing Figures

FIG. 1
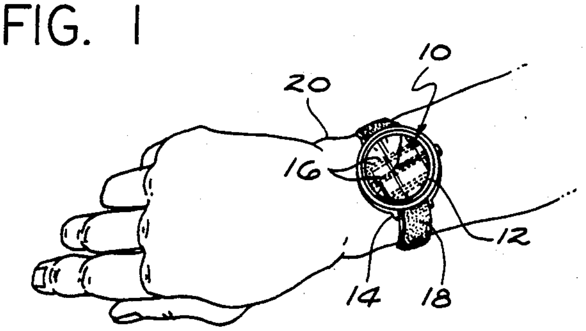
FIG. 3
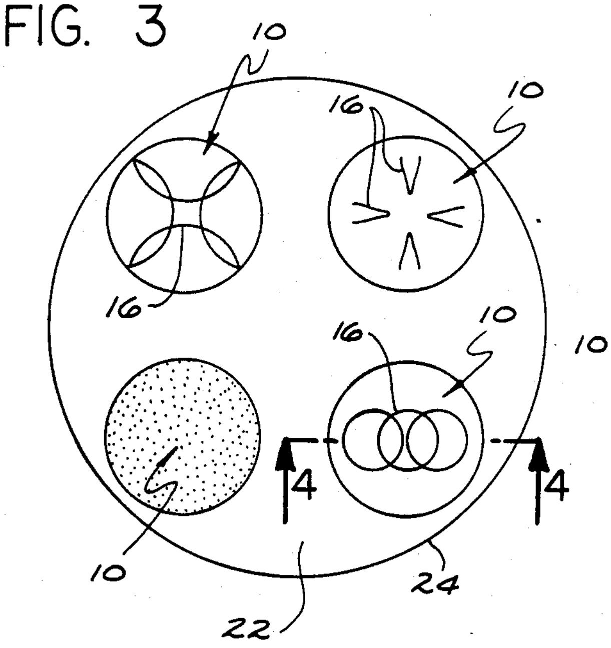
FIG. 2
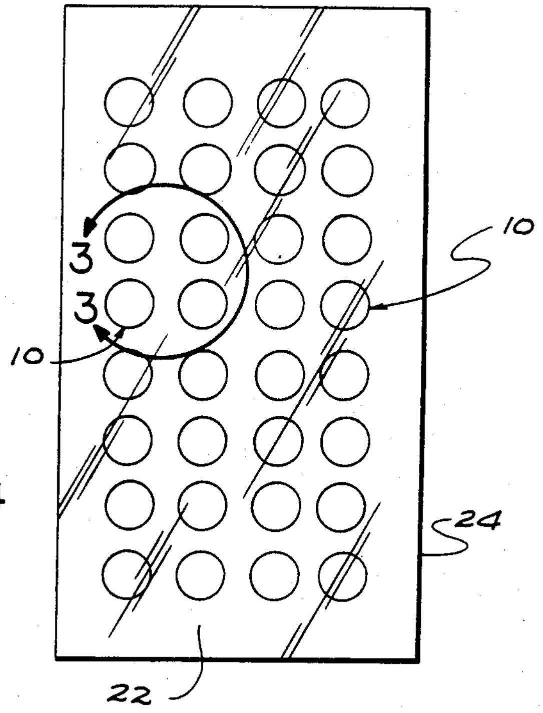
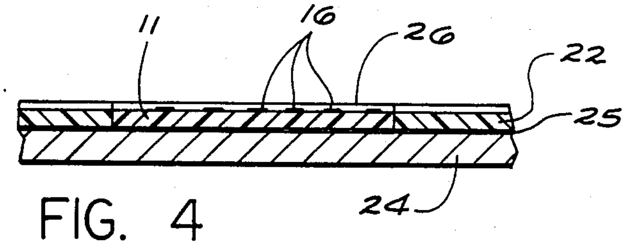
FIG. 4
FIG. 5
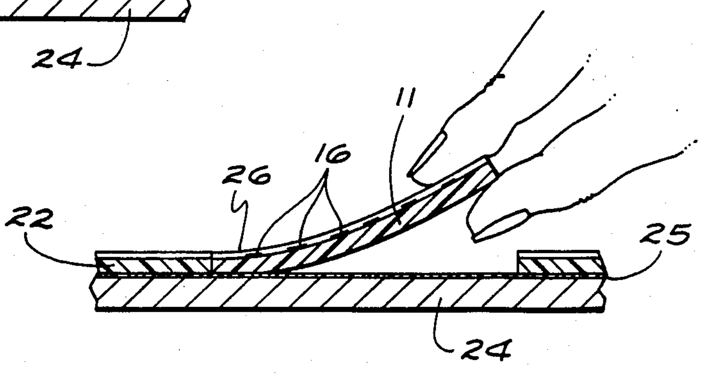

PROTECTIVE OVERLAY FOR WATCH CRYSTAL

BACKGROUND OF THE INVENTION

This invention relates generally to devices for protecting watch crystals against scratching, chipping, pitting, and the like. More specifically, this invention relates to a relatively simple and easily mounted overlay for protecting a glass or plastic watch crystal while advantageously providing decorative ornamentation which does not interfere with normal use of the watch for visual time determination.

Wristwatches are provided in many different forms typically including a lightweight casing carried by a strap or band designed to fit about a person's wrist. Watch or clock mechanisms within the casing include analog or digital time indicating apparatus exposed on a face of the watch to permit rapid visual observation of the current time of day. The time indicating apparatus is normally protected by a transparent glass or plastic watch crystal which prevents damage to the working mechanisms of the wristwatch. However, watch crystals are subject to scratching and chipping and other damage, particularly when the crystal is formed from plastic as used widely on modern relatively low-cost watches. Such scratching or chipping of the watch crystal can significantly detract from the appearance of the wristwatch.

In addition, a substantial market exists for a wide range of novelty items which include wristwatches. For example, brightly colored watch casing and/or wrist straps are relatively popular with many consumers, frequently in the form of a relatively inexpensive watch which can be worn as an item of costume jewelry. Moreover, novelty watches having cartoon or celebrity caricature images on the face thereof have been popular for many years. However, in such novelty watches, a plastic watch crystal is typically used and is highly susceptible to scratching or chipping during use.

The object of the present invention is to provide a relatively lightweight and inexpensive protective overlay for preventing scratching or chipping of a watch crystal, wherein the overlay is adapted to bear selected decorative ornamentation to enhance the visual appearance of the wristwatch without impairing normal use of the watch for indicating time of day.

SUMMARY OF THE INVENTION

In accordance with the invention, a relatively simple, lightweight, and easily mounted protective overlay is provided to prevent scratching or chipping of a watch crystal, wherein the watch crystal may be formed from glass or plastic materials. The protective overlay comprises a transparent disk of a plastic sheet material selected for stick-on attachment to a watch crystal to substantially cover and protect the crystal against damage from scratching or the like.

In the preferred form of the invention, the plastic sheet material comprises a transparent high static vinyl material having a rear surface which will securely mount onto the watch crystal by stick-on attachment without the use of adhesive substance or other fastening means. The transparent disk has a size and shape, normally circular in configuration, to substantially cover the watch crystal and provide protection therefor.

In accordance with one major aspect of the invention, the exposed or front side of the transparent disk bears selected decorative ornamentation of selected color and geometry to enhance the ornamental appearance of a wristwatch when the disk is mounted onto the watch crystal. The decorative ornamentation is applied in a manner leaving a substantial portion of the disk relatively transparent or unobstructed to permit substantially unimpaired use of the watch in determining time of day. The decorative ornamentation comprises, in the preferred form, a vinyl ink of selected color or colors and is sealed by a transparent surface layer applied thereover to prevent ink smudging or other damage to the ornamentation. Moreover, the pressure of the surface layer on the front side of the disk prevents reverse mounting of the disk onto a watch crystal. Interchangeable disks of selected different ornamentation may be provided as desired.

Other features and advantages of the present invention will become more apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective view illustrating a protective overlay embodying the novel features of the invention and shown mounted upon the crystal of a wristwatch;

FIG. 2 is top plan view of a plurality of protective overlays formed in accordance with the invention and shown upon a common backing sheet;

FIG. 3 is an enlarged fragmented view corresponding with the encircled region 3—3 of FIG. 2;

FIG. 4 is an enlarged fragmented vertical sectional view taken generally on the line 4—4 of FIG. 3; and FIG. 5 is an enlarged fragmented vertical sectional view similar to FIG. 4 and illustrating removal of a selected protective overlay from the backing sheet.

DETAILED DESCRIPTION OF THE PREFERRED EMBODIMENT

As shown in the exemplary drawings, a protective overlay referred to generally by the reference numeral 10 is provided for quick and easy mounting onto the transparent crystal 12 of a wristwatch 14. The overlay 10 protects the crystal 12 against scratching or chipping and advantageously bears decorative ornamentation 16 to enhance the appearance of the wristwatch.

The protective overlay 10 of the present invention provides a simple, lightweight, and easy-to-install device for prolonging the life of a watch crystal 12, including watch crystals formed from traditional glass or plastic materials. The overlay 10 is adapted for direct stick-on attachment to the watch crystal without the use of any adhesive material or any other fastening means. Moreover, the overlay is desirably provided with the decorative ornamentation of any selected pattern and color or colors to provide the watch with a user-selected decorative or novelty appearance. The selected decorative appearance is easily changed by mere removal of the overlay 10 and replacement thereof with an alternative overlay bearing a different ornamentation pattern or tint.

As shown in FIG. 1, the overlay 10 is adapted for mounting onto a conventional wristwatch 14. More particularly, the wristwatch typically comprises a relatively lightweight casing enclosing a watch or clock mechanism (not shown) which in turn regulates the position or read-out of time indicating apparatus, such as the illustrative analog watch hands in association with hour markings on the face of the watch. Alternatively, digital time indicating apparatus may be used. In either case, the time indicating apparatus is visible through yet protected by the overlying crystal 12 of glass or plastic and a wrist band or strap 18 is provided for mounting the wristwatch onto the wrist 20 of a person.

The protective overlay 10 is shown in more detail in FIGS. 2–5. The overlay comprises a relatively thin and flat disk 11, typically of a circular shape, formed from a flexible plastic polyvinyl chloride sheet material known commonly as high static vinyl sheet material. This plastic sheet material is highly transparent and the disk is cut from a larger sheet to have a diametric size slightly smaller than the diametric size of a watch crystal 12 upon which the disk is to be mounted. With this construction, the disk will seat upon the watch crystal without wrinkling and with its rear side firmly attached to the crystal in a stick-on manner without use of an adhesive or any other fastening means.

Each disk 11 is advantageously manufactured from an enlarged sheet 22 of the high static vinyl material wherein this enlarged sheet 22 is itself carried as an overlay upon a backing sheet 24. The backing sheet 24 has a top release surface film 25 of a plastic coating or the like chosen for removable stick-on attachment without adhesives to the rear side of the vinyl sheet 22. The thus-mounted vinyl sheet is then die cut by means of suitable cutting apparatus to form a plurality of the disks 11 of selected size and shape, as viewed in FIGS. 2 and 3. This cutting procedure may be controlled to avoid cutting of the backing sheet 24 thereby permitting the multiple disks thereon to be packaged and marketed as a group. Alternately, the multiple overlay disk 10 can be severed along with the respective underlying portions of the backing sheet for individual marketing.

In accordance with one primary aspect of the invention, the overlay disks 11 on the backing sheet 24 have the decorative ornamentation 16 applied to the front or exposed side thereof. This ornamentation, in a preferred form, is provided in different patterns and/or colors as viewed in FIGS. 2 and 3 and may include a transparent film of selected color with or without additional ornamentation as viewed in the lower left-hand corner of FIG. 3. The decorative ornamentation is applied preferably by use of ink selected from the general class of vinyl inks, although alternative forms of decorative ornamentation may be applied. In any event, ornamentation 16 is applied to the front side of the disks to avoid interference with rear side stick-on attachment to the crystal 12 of the watch 14.

Subsequent to application of the decorative ornamentation, the front sides of the disks 11 are covered by a transparent surface layer 26, preferably by use of a transparent vinyl ink or seal coating. This surface layer 26 maintains the integrity of the underlying ornamentation 16 thereby protecting against smudging or other damage. In addition, the surface layer 26 is not conducive to stick-on attachment to the crystal and thus prevent each disk from being mounted on a watch crystal 12 with the front surface presented toward the watch. Instead, only the rear side of each vinyl disk 11 remains exposed for stick-on attachment to a watch crystal.

As shown in FIGS. 4 and 5, a selected overlay 10 including the underlying disk 11 with ornamentation 16 and surface layer 26 is easily peeled from the backing sheet 24 ready for use. The selected overlay 10 can then be placed directly onto the crystal 12 of the wristwatch 14. Secure stick-on attachment occurs without adhesives. The overlay thus provides a protective barrier for preventing crystal contact with objects which would otherwise scratch or mar the crystal. In addition, the overlay provides a highly pleasing decorative appearance which is particularly desirable with novelty watches, but which does not interfere with rapid visual observation of the time indicating apparatus. In this regard, the ornamentation 16 is patterned to avoid undue interference with such visual observation and/or leaves a substantial portion of the watch face unobstructed from view.

The invention beneficially accommodates rapid interchanging of the protective overlay with another selected overlay. That is, a used overlay can be peeled from the watch crystal quickly and easily and without leaving unsightly residue on the crystal. The removed overlay can be returned to its original site on the backing sheet 24, whereupon a different overlay can be selected from the backing sheet for mounting onto the watch crystal. In this manner, the decorative appearance of the combined watch and overlay can be customized and changed to suit the desires or moods of the individual.

A variety of modifications and improvements to the invention described herein are believed to be apparent to those skilled in the art. Accordingly, no limitation on the invention is intended by way of the description herein, except as set forth in the appended claims.

What is claimed is:

1. A protective overlay for mounting onto a watch crystal to prevent scratching or other damage to the watch crystal, said overlay comprising:

a relatively thin and lightweight disk of a transparent high static vinyl sheet material, said disk having a front side and a rear side, said rear side being adapted for direct stick-on static attachment to the watch crystal;

decorative ornamentation applied to the front side of said disk, said ornamentation being of selected color and pattern and permitting unobstructed viewing through a substantial portion of said disk; and a protective transparent surface layer applied to the front side of said disk over said ornamentation.

2. The protective overlay of claim 1 wherein said protective surface layer is selected from a material nonconducive to direct stick-on attachment to the watch crystal.

3. The protective overlay of claim 1 wherein the protective surface layer comprises a coating of a transparent vinyl material.

4. The protective overlay of claim 1 wherein said ornamentation comprises a selected vinyl ink of at least one color.

5. The protective overlay of claim 1 wherein said disk has a size and shape to fit without significant wrinkling onto the watch crystal to substantially cover the crystal.

6. The protective overlay of claim 1 further including a backing sheet for releasably supporting said disk, said backing sheet having a release surface film thereon for removable stick-on attachment with the rear side of said disk.

7. The protective overlay of claim 6 wherein said backing sheet releasably supports a plurality of said disks thereon, said disks having said ornamentation thereon respectively with different decorative appearances, a selected one of said disks being removable from said backing sheet for stick-on attachment to the watch crystal.

8. A protective overlay for mounting onto a watch crystal to prevent scratching or other damage to the watch crystal, said overlay comprising:

a relatively thin and lightweight disk of a transparent high static vinyl sheet material, said disk having a front side and rear side, said rear side being adapted for direct stick-on attachment to the watch crystal, said attachment being attributable to static forces interacting between the disk and the water crystal; and decorative ornamentation applied to the front side of said disk, said ornamenation being of selected color and pattern and permitting unobstructed viewing through a substantial portion of said disk.

9. A method of making a protective overlay for a watch crystal to prevent scratching or other damage to the watch crystal, said method comprising the steps of:

forming a composite sheet structure including a sheet of high static vinyl material having a front side and a rear side, and a backing sheet having a release surface film, with the rear side of the vinyl sheet being attached directly in a stick-on manner, substantially in the absence of an adhesive material, to the release surface film;

cutting the vinyl sheet to form a plurality of disks each having a size and shape to fit without significant wrinkling onto the watch crystal; and applying decorative ornamentation to the front sides of the disks.

10. The method of claim 9 wherein said cutting step comprises cutting the vinyl sheet without cutting the backing sheet to form a plurality of the disks on the backing sheet.

11. The method of claim 10 wherein said ornamentation applying step comprises applying ornamentation of different appearance to the plurality of disks.

12. The method of claim 9 wherein said ornamentation applying step comprises applying ornamentation of different appearance to the plurality of disks.

13. The method of claim 9 further including the step of applying a transparent surface layer to the front side of said disk over said ornamentation.

14. A protective overlay for use in combination with a watch crystal to prevent scratching or other damage to the watch crystal, said overlay comprising:

a relatively thin and lightweight disk of a transparent high static vinyl sheet material, said disk having a front side and a rear side, said rear side being adapted for direct stick-on static attachment to the watch crystal, substantially in the absence of an adhesive material between the rear side of the disk and the watch crystal;

decorative ornamentation applied to the front side of said disk, said ornamentation being of selected color and pattern and permitting unobstructed viewing through a substantial portion of said disk; and a protective transparent surface layer applied to the front side of said disk over said ornamentation.

15. The protective overlay of claim 14 including a backing sheet for releasably supporting said disk, said backing sheet having a release surface film thereon for removable stick-on attachment with the rear side of said disk.

16. The protective overlay of claim 15 wherein said backing sheet releasably supports a plurality of said disks thereon, said disks having said ornamentation thereon respectively with different decorative appearances, a selected one of said disks being removable from said backing sheet for stick-on attachment to the watch crystal.

* * * * *